(12) United States Patent
Williams

(10) Patent No.: US 8,356,021 B2
(45) Date of Patent: Jan. 15, 2013

(54) METHOD AND APPARATUS FOR INDEXING IN A REDUCED-REDUNDANCY STORAGE SYSTEM

(76) Inventor: Ross Neil Williams, Adelaide (AU)

( * ) Notice: Subject to any disclaimer, the term of this patent is extended or adjusted under 35 U.S.C. 154(b) by 99 days.

(21) Appl. No.: 11/372,603

(22) Filed: Mar. 10, 2006

(65) Prior Publication Data

US 2006/0271540 A1    Nov. 30, 2006

Related U.S. Application Data

(60) Provisional application No. 60/660,961, filed on Mar. 11, 2005.

(51) Int. Cl.
*G06F 7/00* (2006.01)
*G06F 17/30* (2006.01)

(52) U.S. Cl. ........................ 707/696; 707/797

(58) Field of Classification Search ............. 707/2, 696, 707/791, 793, 796–797, 801
See application file for complete search history.

(56) References Cited

U.S. PATENT DOCUMENTS

| | | | |
|---|---|---|---|
| 4,541,076 A | 9/1985 | Bowers et al. | |
| 4,876,541 A | 10/1989 | Storer | |
| 5,049,881 A | 9/1991 | Gibson et al. | |
| 5,371,499 A * | 12/1994 | Graybill et al. | 341/51 |
| 5,463,389 A * | 10/1995 | Klayman | 341/51 |
| 5,742,811 A * | 4/1998 | Agrawal et al. | 707/6 |
| 5,829,018 A | 10/1998 | Moertl et al. | |
| 5,842,196 A * | 11/1998 | Agarwal et al. | 707/2 |
| 5,860,153 A | 1/1999 | Matena et al. | |
| 5,893,086 A * | 4/1999 | Schmuck et al. | 707/1 |
| 5,940,841 A * | 8/1999 | Schmuck et al. | 707/205 |
| 5,990,810 A * | 11/1999 | Williams | 341/51 |
| 6,144,983 A * | 11/2000 | Klots et al. | 718/104 |
| 6,240,409 B1 * | 5/2001 | Aiken | 1/1 |
| 6,292,795 B1 | 9/2001 | Peters et al. | |
| 6,374,266 B1 | 4/2002 | Shnelvar | |
| 6,438,562 B1 * | 8/2002 | Gupta et al. | 707/201 |
| 6,493,709 B1 * | 12/2002 | Aiken | 1/1 |
| 6,505,206 B1 * | 1/2003 | Tikkanen et al. | 707/101 |
| 6,594,665 B1 * | 7/2003 | Sowa et al. | 707/10 |
| 6,704,730 B2 * | 3/2004 | Moulton et al. | 707/6 |
| 6,754,799 B2 * | 6/2004 | Frank | 711/216 |
| 6,757,686 B1 * | 6/2004 | Syeda-Mahmood et al. | 707/100 |
| 6,912,645 B2 * | 6/2005 | Dorward et al. | 711/216 |
| 6,959,384 B1 * | 10/2005 | Serret-Avila | 713/176 |
| 2003/0009482 A1 * | 1/2003 | Benerjee et al. | 707/200 |
| 2003/0018878 A1 | 1/2003 | Dorward et al. | |
| 2004/0064737 A1 * | 4/2004 | Milliken et al. | 713/201 |
| 2006/0282457 A1 | 12/2006 | Williams | |
| 2007/0192548 A1 | 8/2007 | Williams | |

OTHER PUBLICATIONS

Sriram Ramabhadran et al., Prefix Hash Tree an Indexing Data Structure over Distributed Hash Tables, Jan. 2004, http://www.icsi.berkeley.edu/cgi-bin/pubs/publication.pl?ID=000071.*

(Continued)

*Primary Examiner* — Jeffrey A Burke

(57) ABSTRACT

Method and apparatus for indexing subblocks in a reduced-redundancy storage system. Each subblock is hashed to an K-bit key and an entry for the subblock added to an index data structure comprising of a tree of hash tables. In a further aspect, by replacing the top of the tree with an array, the data structure can achieve O(1) access time for random keys while still providing relatively smooth growth.

29 Claims, 9 Drawing Sheets

OTHER PUBLICATIONS

Dynamic Hash Tables, Per-Ake Larson, Apr. 1988, vol. 31 No. 4.*
Hash Table Methods, W.D. Maurer and T.G. Lewis, Computing Surveys, vol. 7 No. 1, Mar. 1975.*
Optimal Parameter Selection for Efficient Memory Integrity Verification Using Merkle Hash Trees, Dan Williams and Emin Sirer, NCA 2004.*
Linear Hashing: A New Tool for File and Table Addresses, Witold Litwin, IEEE 1980.*
Implementing a Dynamic Compressed Trie, Stefan Nilsson and Matti Tikkanen, published 1998.*
Extensible Hashing, Author Unkown, Chapter 9—Extensible Hashing, downloaded from www.isqa.unomaha,edu, pp. 1-8.*
Fagin, Ronald et al., Extendible Hashing—A Fast Access Method for Dynamic Files, ACM Transactions on Database Systems, vol. 4, No. 3, Sep. 1979, pp. 315-344.*
Langdon, G.G., Rissanen, J.J., "Compression of Black-White Images with Arithmetic Coding." IEEE Transactions on Communications (1981), 29(6), pp. 858-867.
Madden, Sam, "Good Things Come in Small Packages: The Advantage of Compression in Column Databases." The Database Column (Sep. 11, 2007), pp. 1-5.
Nelson, Mark, "Arithmetic Coding + Statistical Modeling=Data Compression." Dr. Dobb's Journal (Feb. 1991), pp. 1-12.
Tanaka, Hatsukazu, Leon-Garcia, Alberto, "Efficient Run-Length Encodings." IEEE Transactions on Information Theory (Nov. 1982), 28(6), pp. 880-890.
European Search Report from co-pending European Patent Application No. 06705000.5 having a date Sep. 17, 2010—7 pgs.
Ramabhadan, et al.: "Prefix Has Tree: an indexing data structure over Distributed Hash Tables", Internet Citation 2004, XP-002467877, retrieved from the Internet: URL:http://berkeley.intel-reserach.net/sylvia/pht.pdf on Feb. 5, 2008—10 pgs.
Nilsson et al: "An experimental study of compression methods for functional tries"; May 2002; Algorithmica Springer-Verlag USA, vol. 33, No. 1, Internet Citation XP007914674—pp. 101-115.
Ross Williams, "An Algorithm for Matching Text (possibly original)". Google Groups, Comp. Compression, posted Jan. 27, 1992 (5 pgs).
Richard M. Karp, et al., "Efficient Randomized Pattern-Matching Algorithms". IBM J. Res. Development, Mar. 1987, pp. 249-260, vol. 31, No. 2.

* cited by examiner

Hash Table Collision

METHOD AND APPARATUS FOR INDEXING IN A REDUCED-REDUNDANCY STORAGE SYSTEM

CROSS-REFERENCE

This application claims the benefit of U.S. Provisional Application No. 60/660,961, filed Mar. 11, 2005, which is incorporated herein by reference in its entirety.

This application is related to the following copending patent applications: application Ser. No. 11/373,569 for Method and Apparatus for Detecting the Presence of Subblocks in a Reduced-Redundancy Storage System, invented by Ross Neil Williams, filed Mar. 10, 2006; and application Ser. No. 11/373,420 for Method and Apparatus for Storage Data with Reduced Redundancy Using Data Clusters, invented by Ross Neil Williams, filed Mar. 10, 2006 which are incorporated herein by reference in their entirety.

FIELD

The field of the invention-relates to a method and apparatus for indexing subblocks of data in a reduced-redundancy computer storage system.

BACKGROUND OF THE INVENTION

In a reduced-redundancy computer storage system, each BLOB (Binary Large OBject—a finite sequence of zero or more bytes (or bits)) is represented as a sequence of subblocks from a pool of subblocks. FIG. 1 (prior art) shows a pool of subblocks and two BLOBs that are represented as lists of subblocks from the pool.

Each BLOB of data to be stored is divided into subblocks and matched against the subblocks in the pool. Each subblock in the new BLOB that is already present in the pool is replaced by a reference to the subblock in the pool. Each subblock in the new BLOB that is not in the pool is added to the pool. By storing only new unique subblocks, the storage system forms a reduced-redundancy representation of the BLOBs stored, and thereby reduces the amount of storage space used. FIG. 2 depicts the addition of a new BLOB 20 consisting of the subblocks ABCXY into a pool that already contains subblocks A, B and C 22. The new BLOB 24 is represented as a list of subblocks consisting first of the existing subblocks A, B and C and then of two new subblocks X and Y that are added to the subblock pool as a result of adding the new BLOB.

To implement this method, a reduced-redundancy storage system typically consists of the following components: a BLOB table 30 (to represent the BLOBs and allow them to be retrieved), a subblock pool 32 (to hold the actual subblock content), and a subblock index 34 (to quickly identify whether a subblock is present in the store and locate it if it is) (FIG. 3). Each of these components can be implemented in a wide variety of ways.

Of critical importance to the speed of a reduced-redundancy storage system is the subblock index. Whereas the BLOB table is typically accessed just once or twice for each BLOB stored, and the subblock pool can operate on subblocks in groups for greater efficiency, the subblock index is accessed (at least in a simplistic implementation) for every subblock that is presented to the system for storage. If the subblocks are a kilobyte each, this is about twenty thousand index lookups just to store twenty megabytes of data. It is therefore vital that the subblock index is fast.

The actual speed of access to the index depends on whether the index is held in memory or on disk, as a random memory access takes of the order of fifty nanoseconds whereas a random disk access takes of the order of ten milliseconds (about 200,000 times longer). The index could be held completely on disk, partially on disk, or entirely in memory. While it is clearly desirable for the index to reside entirely in memory, this may be impractical or too expensive if the index is large.

If some part of the index is to be held on disk, then it is important to design the index so as to minimize disk accesses, and in particular random access disk accesses.

Another requirement of an index data structure is that it be capable of scaling, and of scaling smoothly, as storage systems often grow to sizes that are larger than expected.

Aspects of the present invention provide a data structure that can grow smoothly while providing high speed access with a low number of random access disk operations.

SUMMARY OF THE INVENTION

This specification discloses a data structure for implementing an index of blocks of data, where a block includes BLOBs and subblocks. For the purpose of exposition, this specification describes, without limitation, indexes of subblocks.

A subblock index maps keys derived from subblocks to subblock storage locations. FIG. 18 shows this, with a depiction of a mapping method. Keys 180 are typically fixed-length hashes (e.g. 128-bit MD5 hashes 182) of subblocks 184. Subblock storage locations may take many forms, but all assist in locating the subblock. For the purposes of exposition, the hashes will be referred to as keys and the subblock locations will be referred to as values 186.

In some aspects of the invention where the sole purpose of the data structure is to record the presence or absence of keys, there will be no values. Another way or expressing this is that the values are all zero bytes long. An example, without limitation, is when one computer is keeping track of the subblocks held in another computer.

In an aspect of the invention, the key/value mapping is implemented using a data structure comprising of a binary digital search tree (over successive bits of the key) whose leaves each contain a hash table that maps keys falling into the leaf to their corresponding values (FIG. 4). The non-leaf nodes 50 do not contain entries. As entries are added to the data structure, each leaf node 52, 54 whose hash table becomes full 54 (to a particular fullness level) is replaced by a non-leaf node 56 with two leaf node descendents 58, 59 (FIG. 5). During this splitting process, the contents of the hash table are split between the two new leaf nodes, with each entry being allocated to one of the two new leaves in accordance with the next unused (by the tree) bit of its key (FIG. 6). The keys of each leaf's hash table entries should be based only on those bits of the original key not already constrained by the position of the leaf in the tree (FIG. 7).

If the hash tables in the leaf nodes are configured to be quite large (e.g. thousands of entries), then an interesting property of the data structure is that the non-leaf nodes in the tree occupy very little space in comparison to the leaf nodes. Therefore, in a further aspect of the invention, the non-leaf nodes are held in memory and the leaf nodes (or at least the hash tables they contain) are held on disk (FIG. 8). This organisation has several advantages. First, this organisation uses very little memory. Second, as the width of the hash (e.g. 128 bits) provides an upper bound on the depth of the tree, tree traversals are very fast, comprising, in the worst case of a tight loop of about 128 (for a 128-bit key) random access memory seeks (the totality of which is still about 1500 times faster than a random disk seek). Third, so long as the hash tables in the leaves are not allowed to become too full, the leaf hash table lookup that will occur at the end of the binary tree root-to-leaf traversal will consist of a single random access disk seek. This is time consuming, but far less time consuming than the several random-access disk seeks that would be required if the non-leaves of the tree were held on disk too.

In some embodiments, the keys are subblock hashes. As these are (at least in theory) uniformly randomly distributed, it is likely that the tree will be fairly well balanced at each stage of its growth. This provides the opportunity to reduce even the small tree-traversal access time. In a further aspect of the invention, the top L levels of the tree are replaced by a single array of $2^L$ entries (FIG. 9); This reduces the L steps of traversing the top L levels of the tree to a single step of looking up the array. As growth of the tree is likely to be balanced, it is likely that there will only be a few levels of tree beneath the array (FIG. 9). The choice of how many levels (L) of tree to replace by an array could be determined by a variety of factors, the most likely one being the level of fullness of the tree at each level.

While the uniform tree growth that results from the uniformity of hash values allows the top of the tree to be replaced by an array, the same uniformity causes discontinuities in the growth of the leaves of the tree. Experiments have shown that the tree can grow so evenly that the entire bottom layer of leaf nodes fill up and split at roughly the same time. While this does not threaten correctness, it does have real-time implications because splitting a leaf node requires splitting the entries in the node's hash table between the hash tables of its descendents and this takes much longer than merely adding a new entry to a table. If all the leaves at one level in a tree split at roughly the same time, the speed of the system will drop until the splittings are complete and then will resume its normal level. There are several ways to avoid this dip in performance. In a further aspect of the invention, a random fullness threshold is assigned to each leaf when the leaf is created. The leaf is split only when its hash table's fullness reaches the threshold. For example, one leaf might be allocated a 40% threshold and another 80% threshold. The random values can be chosen according to some distribution that does not choose values below a minimum (so as not to waste space) or above a maximum (so as to avoid long overrun chains within the table). Random thresholds spread out the times when the leaves at a given level split. Another approach is to create hash tables of random size in each leaf node when the node is created. The differently-sized hash tables will then fill at different times.

In summary, a method is provided for indexing subblocks that uses up very little memory, requires a single random disk access to lookup a key, is scalable, and grows smoothly with little or no significant real-time impact along the way.

INCORPORATION BY REFERENCE

All publications and patent applications mentioned in this specification are herein incorporated by reference to the same extent as if each individual publication or patent application was specifically and individually indicated to be incorporated by reference.

TERMINOLOGY

Binary Digital Search Tree: A binary tree where the decision made at each level is determined by successive bits of the key.

BLOB (Binary Large OBject): This is a finite sequence of zero or more bytes (or bits) of data. Despite its name, a BLOB is not necessarily large; a BLOB could be as small as a few bits or as large as gigabytes.

Block: A finite sequence of zero or more bytes (or bits) of data. This term is abstract and includes without limitation BLOBs and subblocks.

Bucket: See Index Bucket.

Collision: A collision occurs in a hash table when two or more keys hash to the same slot (position) in the table.

Collision Chain: When an entry is to be added to a hash table and the entry collides with another entry, it can be stored by forming a collision chain of entries from the original entry. The collision chain can exist within the table or external to it.

Digital Search Tree: A tree where the decision made at each level is determined by successive digits of the key.

Disk: A random access storage medium used by computers. Typically, the term refers to spinning platters of metal holding magnetised data (hard disks). In the context of this document, the term may more broadly be taken to mean a random access storage medium that is significantly slower than Memory.

Entry: See Index Entry.

Hash: A fixed-length sequence of bytes (or bits) generated by a hash algorithm. Hashes of subblocks may be used as representatives of the subblocks to index and compare subblocks.

Hash of Subblock: See Subblock Hash.

Hash Table: A means of mapping keys to values using an array, where values (and sometimes also keys or part of keys) are stored in the array at positions determined by hashing the key.

Index Bucket: In embodiments that implement the subblock index using a hash table, the hash table may be organised as an array of buckets each of which contains a fixed number of entry slots each of which may either be empty or contain an entry. One purpose of index buckets is to organise a hash table into pieces that can be read from disk and written to disk as a group so as to reduce the number of random access disk operations.

Index Entry: A record in the subblock index. In some embodiments an index record contains an index key and an index value. In some embodiments an index record contains part of an index key and an index value. In some embodiments an index record contains just an index value. In some embodiments an index record contains no value and some or all of a key.

Index Key: The information about a subblock provided to the subblock index in order to retrieve information about the subblock. In some embodiments, the information is retrieved by locating and reading an index entry.

Index Value: The information yielded about a subblock by the index when the subblock (or a derivative of the subblock, an example of which is its hash) is looked up in the index. In some embodiments, the value consists of the location of the subblock on disk. In other embodiments there may be no value if the sole purpose of the index is to record the presence or absence of a key.

Keys: See Index Key.

Leaf: The leaf of a search tree is a node that does not have any descendents.

Memory: A random access storage medium used by computers, typically referring to Random Access Memory (RAM). In the context of this document, the term may more broadly be taken to mean a random access storage medium that is significantly faster than Disk.

Partitioning Method: A method for dividing a BLOB into one or more subblocks such that every byte (or bit) in the BLOB falls within exactly one subblock.

Reduced-Redundancy Store: A storage system that eliminates, in its representation of data, some of the duplicated data within the set of data that it stores.

Slot: A position in a hash table. A slot may be empty or it may contain an entry.

Store: See Reduced-Redundancy Store.

Subblock: A sequence of bytes (or bits) that has been identified as a unit for the purpose of indexing, comparison and/or redundancy elimination. A BLOB may be partitioned into subblocks.

Subblock Hash: The result of applying a hash algorithm to a subblock. Hashes of subblocks may be used, for example, as representatives of the subblocks to index and/or compare the subblocks.

Subblock Index: A data structure that maps (or otherwise associates) a subblock's hash (or the subblock itself) to the location of the subblock (e.g., without limitation, a cluster number (and possibly also a subblock identifier)).

Subblock Pool: A collection of subblocks in a reduced-redundancy storage system.

Traversal: See Tree Traversal.

Traverse: See Tree Traversal.

Tree Traversal: "Traversing a tree" usually means visiting every node of the tree, but in the context of this document, it means following the path from the root of the tree to a leaf.

Values of the Index: See Index Value.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

The reference to any prior art in this specification is not, and should not be taken as, an acknowledgement or any form of suggestion that such prior art forms part of the common general knowledge.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Specific embodiments of the invention will now be described in some further detail with reference to and as illustrated in the accompanying figures. These embodiments are illustrative, and are not meant to be restrictive of the scope of the invention. Suggestions and descriptions of other embodiments may be included within the scope of the invention but they may not be illustrated in the accompanying figures or alternatively features of the invention may be shown in the figures but not, described in the specification.

The reference to any prior art in this specification is not, and should not be taken as, an acknowledgement or any form of suggestion that such prior art forms part of the common general knowledge.

Figure 21:
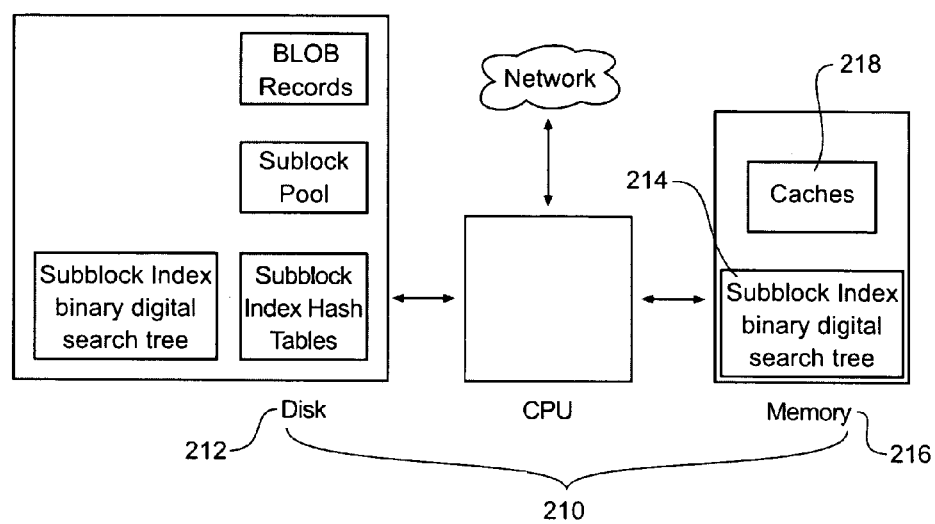
FIG. 21 shows how an embodiment might be deployed on typical computer hardware. All the data structures reside on disk. The binary digital search tree is held in memory along with some caches that store working copies of some BLOB records and parts of the subblock pool.

FIG. 21 shows how an embodiment might be deployed on typical computer hardware 210. All the data structures reside on disk 212. The binary digital search tree 214 is held in memory 216 along with some caches 218 that store working copies of some BLOB records and parts of the subblock pool.

I. Index Keys

The subblock index data structure is used to determine the existence and location of a subblock. This suggests that the data structure's keys be derived from the subblock.

The subblocks themselves could be used as keys. However, this could result in a very deep tree. For example, if all of the subblocks started with one thousand bytes that are zero, every access of the tree would have to process those thousand bytes of data before making any real progress (i.e. progress that distinguishes one subblock from another) down the tree.

Hashes of subblocks make better keys than the subblocks themselves because hashes are of finite width (e.g. 128 bits (16 bytes)) and because hashes distil (in a lossy manner) all of the bytes in each subblock. Finite width makes the keys easier to manipulate and ensures that the tree cannot grow deeper than the hash width. Hashing all of the bytes of the subblock into a hash key eliminates the inefficiencies that would arise where the subblocks have long common prefixes. An advantage of using subblock hashes as keys is that it is very likely that the resultant keys will be randomly and uniformly distributed within the space of possible keys.

II. Index Values

Each value of an index consists of a record containing one or more subblock attributes.

In a reduced-redundancy storage system, the value could be the location of a subblock being indexed.

Examples of storage location values are, without limitation: a position on a disk, a filename, a file number, a subblock cluster number, a mask identifying a small number of subblock clusters, and the combination of a cluster number and a subblock identifier within the cluster.

In communications applications, the value could carry the location of a subblock within a network, or even no information at all, with the application relying simply on the existence of a subblock's key in the index to record the existence of a subblock on a remote computer.

The nature of the values depends largely on the nature of the indexing application.

III. The Tree

An aspect of the invention consists of a tree of hash tables. There are a wide variety of trees and a wide variety of hash tables that could be used in each of these roles.

Figure 1:
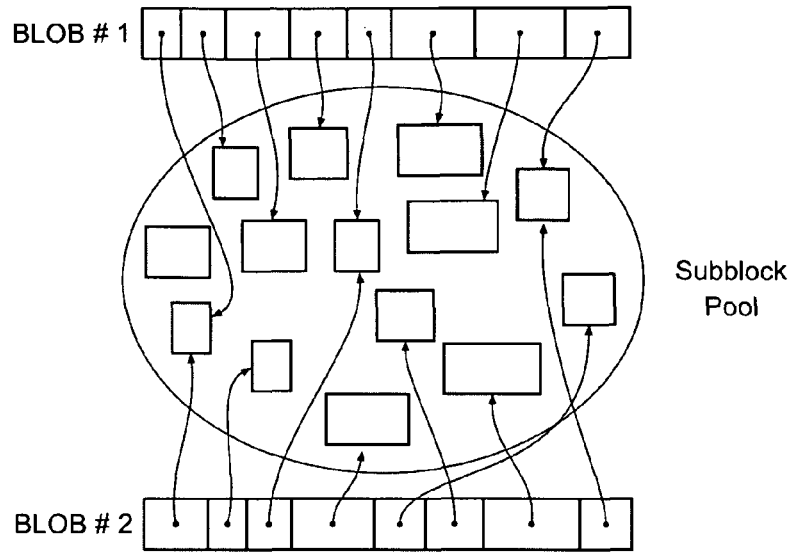
FIG. 1 depicts the representation of two BLOBs of data as sequences of subblocks, some of which appear in both BLOBs.
Figure 2:
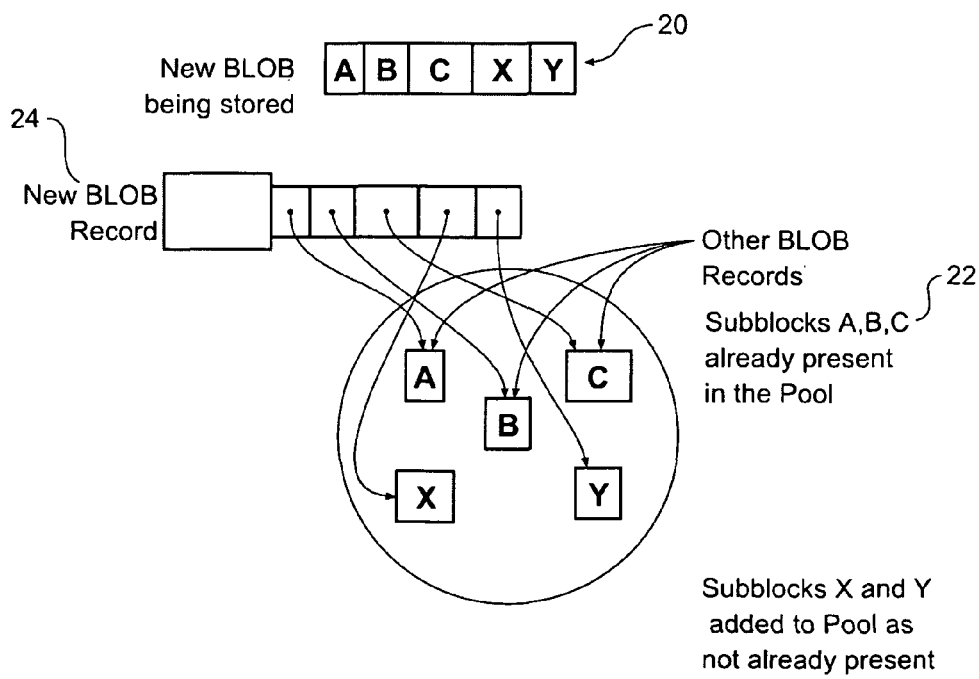
FIG. 2 shows how only new unique subblocks (X and Y) of a new BLOB consisting of subblocks ABCXY need be added to the subblock pool (subblocks A, B and C already being present).
Figure 3:
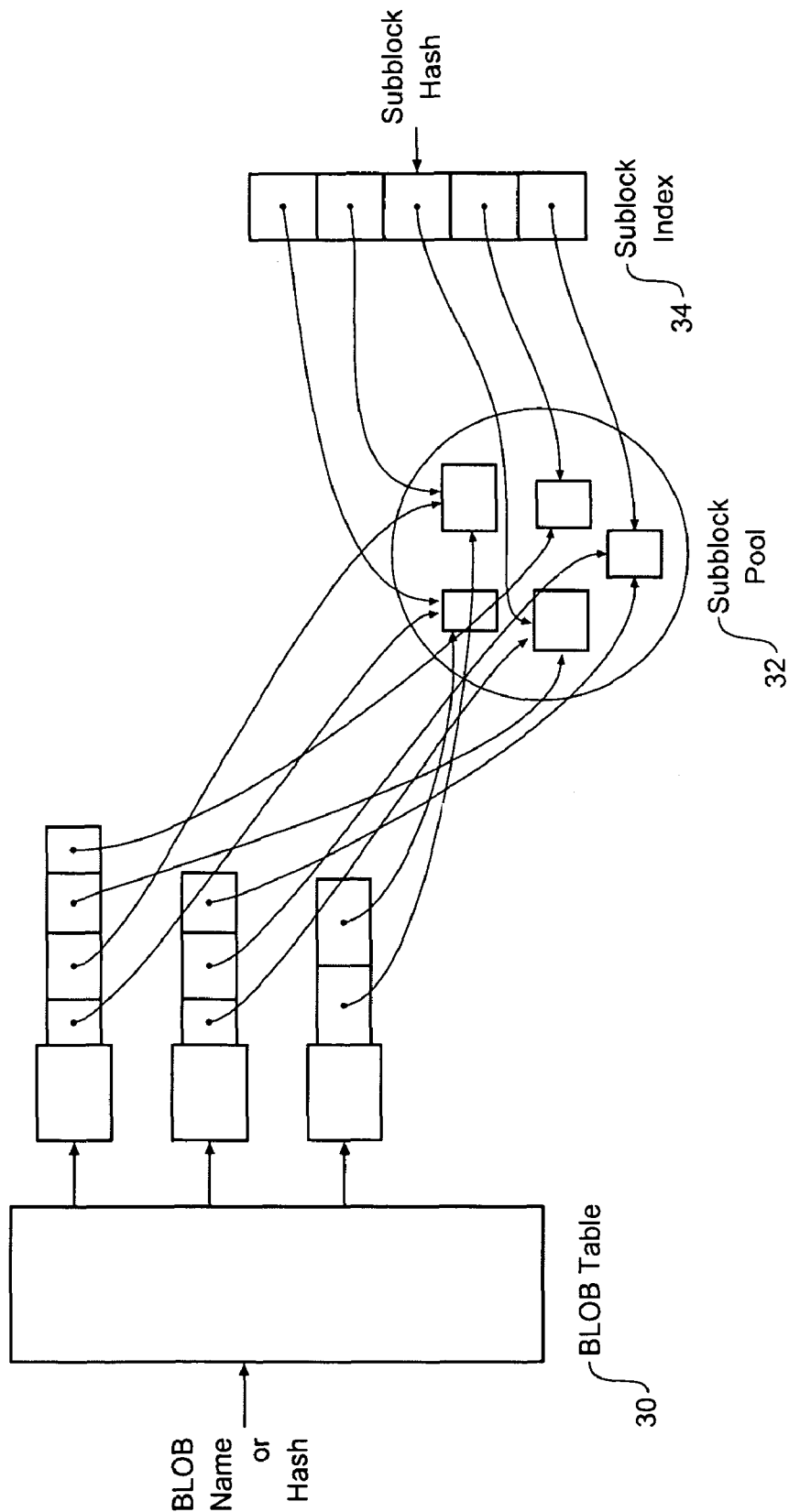
FIG. 3 depicts a reduced-redundancy storage system comprising of a BLOB table, a subblock pool, and a subblock index.
Figure 4:
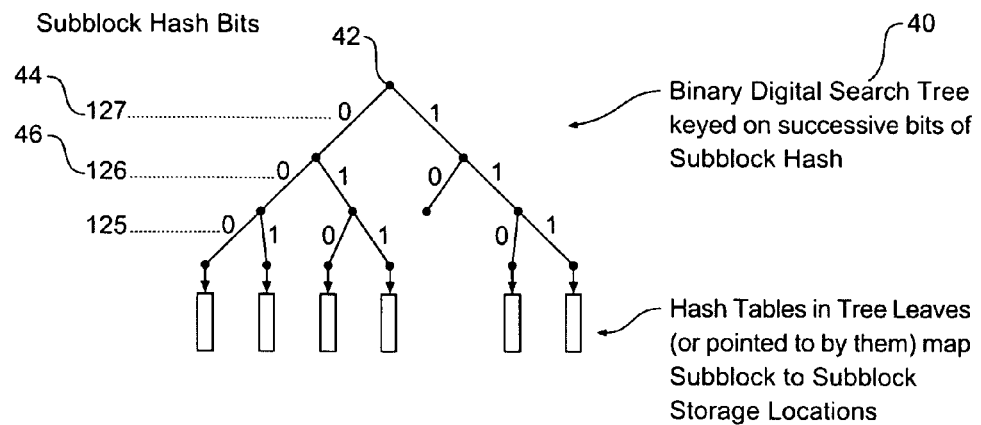
FIG. 4 depicts a data structure used for mapping subblock hashes to subblock storage locations, being a binary digital search tree (over successive bits of the subblock hash) whose leaves are hash tables that contain key/value pair entries.
Figure 5:
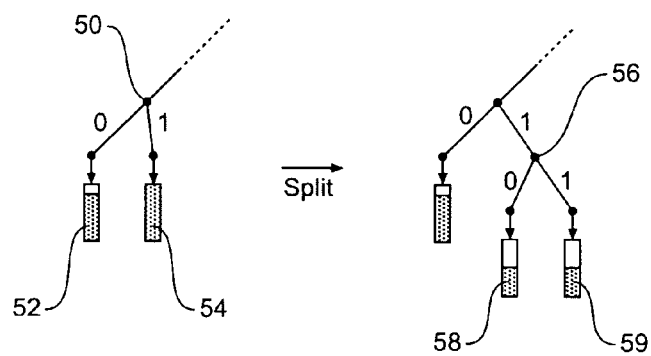
FIG. 5 shows how a leaf node on the tree splits when its hash table becomes sufficiently full.

If the keys are subblock hashes, a digital search tree is particularly effective because it is very simple to traverse. In a digital search tree, the key is divided into fixed-width digits and each successive digit is used to choose a branch at each level of the tree. For example, in a typical embodiment, a binary digital search tree 40 could be used, with the hash divided up into one-bit digits. Starting at the root 42 of the binary digital search tree, the leftmost (most significant) bit 44 of the hash could be used to decide whether to go left or right. Once at a direct child of the root 46, the next bit would be used to make the next decision, and so on (FIG. 4).

Figure 10:
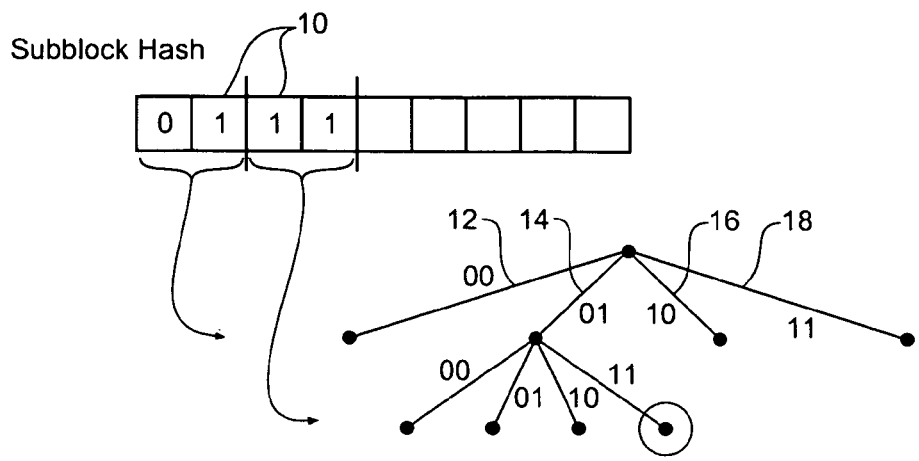
FIG. 10 depicts a quaternary digital search tree in which successive pairs of bits determine the choice made at each level.

If the hash were divided into groups of two bits 10, each such group could be treated as a digit and the digital search tree would be a quaternary digital search tree with four branches 12, 14, 16, 18 emanating from each non-leaf node (FIG. 10). Similarly, digits of three bits each would result in a tree with a furcation of eight. Any other furcation could be used too.

It is easy to show that, for any non-small hash table size, the non-leaf nodes in the tree use little memory. Consider the case of a binary digital search tree and K-bit hashes. If each non-leaf node of the tree consists of eight bytes (two four-byte pointers), then (taking into account the sharing of ancestor nodes with other leaf nodes), the total memory cost of each leaf will be $8 \times (1/2 + 1/4 + 1/8 + \ldots + 1/(2^L))$ where L is the depth of the leaf. Even for infinite L, this is still only 8 bytes. If the hash table in each leaf is over a megabyte, then the non-leaf nodes constitute less than one hundred thousandth of the total space consumed by the entire data structure. This high ratio makes it economic to store the tree in memory.

Figure 6:
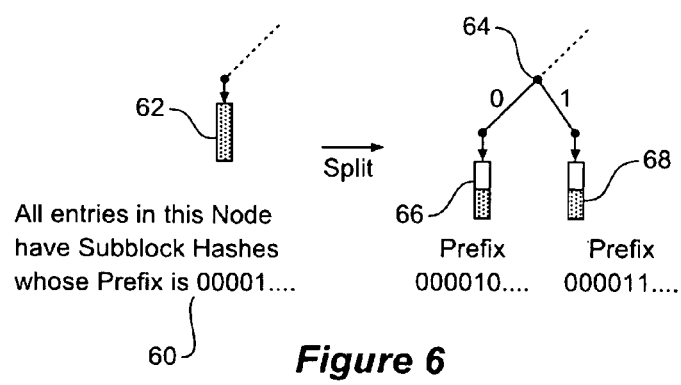
FIG. 6 depicts the splitting of a leaf node of the binary search tree, causing the leaf node to convert into a non-leaf node and its entries within the hash table to be split between two new descendent leaf nodes. Because the new leaf nodes are one level deeper in the tree, accessing entries in these leaf nodes involves using an additional bit of the subblock hash.
Figure 7:
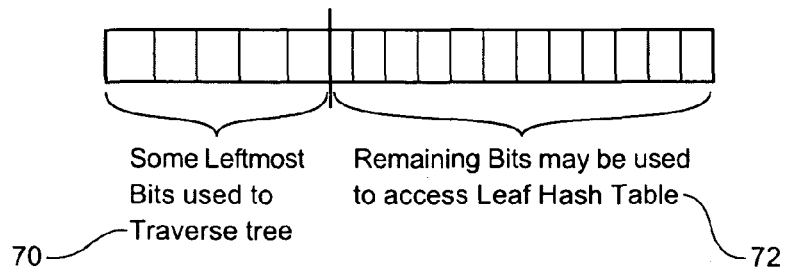
FIG. 7 depicts a subblock hash and shows how a left part of it may be used to traverse the binary digital search tree, with the remainder being available to access the hash table in the leaf.

Note that all the key/value pair entries stored in a particular leaf have keys with a common prefix 60, 70. There is therefore no point in using any part of this common prefix to access the hash table in the leaf (FIG. 6, FIG. 7).

There are several challenges associated with the use of hash tables: how to address the table, how to deal with collisions, where to store the table, and how to split the table.

IV. Hash Table Addressing

Consider the point during a search for a subblock where the subblock has been hashed and the first T bits of the hash have been used to traverse the tree, resulting in the arrival at a leaf. Inside the leaf is a hash table. What happens next?

First, as the first T bits have been used to arrive at the leaf, it is certain that all the keys that are stored, or will be stored, in the leaf's hash table have the same T bit prefix (FIG. 6 and FIG. 7). It is therefore important not to use those T bits to select a position within the hash table.

If the hash table contains $N=2^P$ slots, where P is a positive integer, it is easy to hash the key into the hash table. Simply use the P bits 72 of the key that follow the T bits 70 already used to get to the leaf. If N is not a power of two, a different approach can be used. Take the next Q bits following the first T bits and divide them by N. The remainder is the hash table index. This should yield a fairly even spread in the table, so long as Q is a few bits higher than $\log_2(N)$ (so as not to significantly load one part of the table more than another). A variety of other hashing methods could be used.

V. Hash Table Collisions

Figure 11:
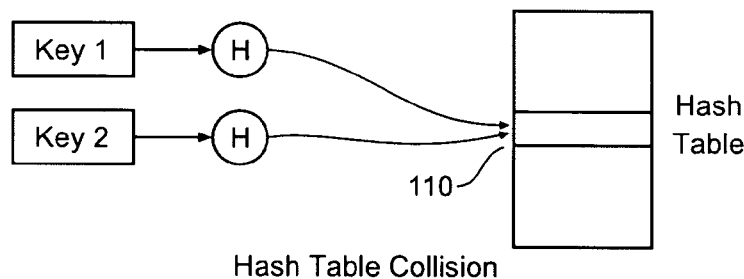
FIG. 11 (prior art) depicts a hash table collision in which two keys hash to the same position in the table.

A collision occurs in a hash table when two or more keys hash to the same position (slot) 110 (FIG. 11) (prior art). One way to address this situation is simply to throw away the second entry. This can be an appropriate choice in some contexts. However, if the hash table is not allowed to be lossy, this option cannot be used, and one of a wide variety of techniques can be employed to deal with this "overflow" situation.

Figure 12:
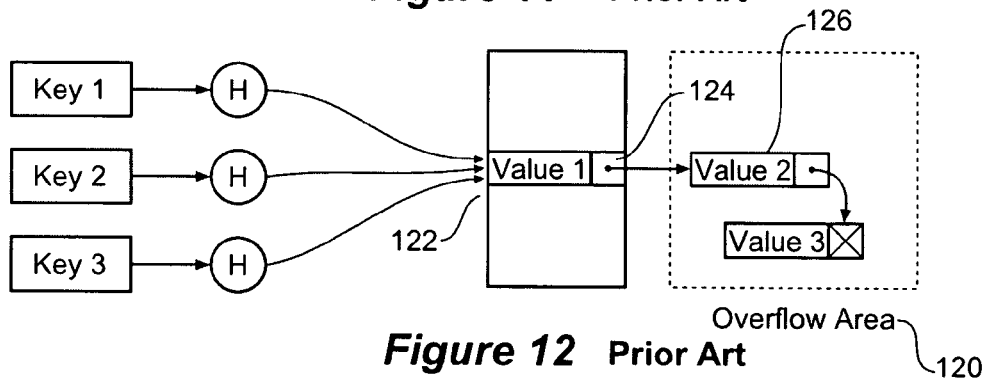
FIG. 12 (prior art) depicts a hash table with an external overflow area.

One classic technique for dealing with a collision is to have a separate storage area called an overflow area 120. Each hash table slot 122 contains an overflow field 124. If a collision occurs in the slot, the overflowing entry is stored in the overflow area and a pointer to the entry is placed in the slot 126 (FIG. 12) (prior art). The overflow area allows entries to point to each other too, allowing each overflowing slot to point to a list of entries (FIG. 12) (prior art). This technique works well if a separate overflow area is available (as it might be in the form of a memory heap if the hash table were in memory). However, if the hash table is on disk, placing overflowing entries in an overflow area usually involves performing at least one additional random access seek.

A more integrated approach to collisions is to store the colliding entry in the hash table itself. In a classic approach, when a collision occurs, the second item's key is hashed using a second hash function and the resultant slot examined. If it is empty, the entry can be stored there. If it is not, a third hash function can be invoked and so on until an empty slot is found. If the entire table is full, then in some embodiments the table is split before the new entry is added. In general, a hash function H(K,X) can be defined where K is the key to be hashed and X is a positive integer which can be increased to find successive candidate locations in the hash table for a colliding entry. To search for a key K, slots H(K,X) are examined for X=1, 2, . . . until a slot containing the key is found, or an empty slot is encountered (which indicates the end of the particular hash overflow chain within the table).

Figure 13:
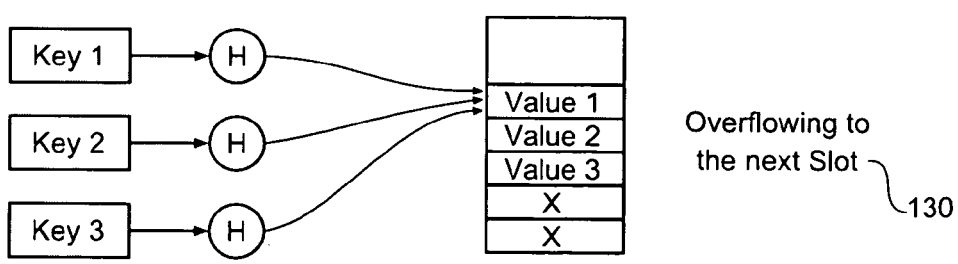
FIG. 13 (prior art) depicts in-table overflow where overflowing entries are stored in the next empty slot (linear probing).

However, if the hash table is large and on disk, following a collision chain requires performing a series of random access seeks on the disk, which is extremely time consuming. This can be avoided by defining H(K,X)=H(K,X−1)+1; in other words, overflowing to the next adjacent slot 130 (FIG. 13) (prior art) (wrapping around at the end of the table). This technique, called linear probing, keeps the accesses local. If, when reading the first slot accessed, the next S slots are read as well, for small S the disk operation takes no extra time (e.g. reading 1K instead of 12 bytes) and provides the overflow slots as well. Once the new entry is added, the slots can also be written back to disk as a group. The value S can be adjusted (possibly dynamically) so as to ensure that it is rare for a collision chain to span more than S slots (and thereby require an additional disk access).

VI. Hash Table Buckets

Figure 14:
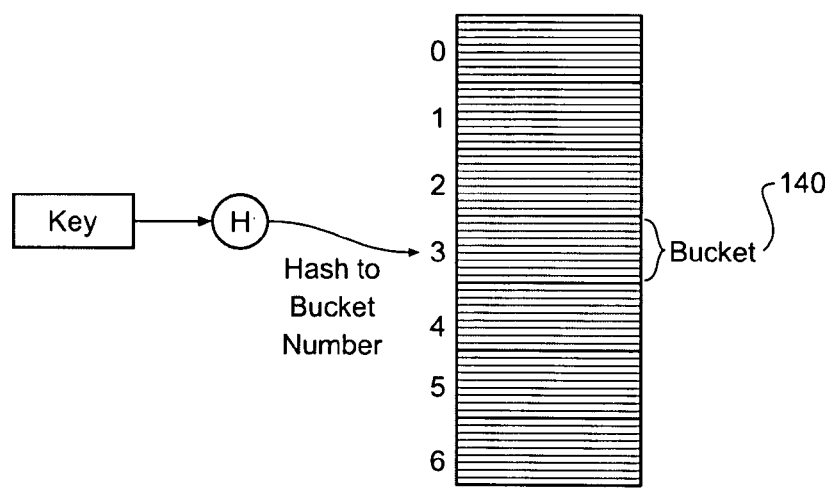
FIG. 14 depicts a hash table organised as an array of buckets, each of which contains a fixed number of entry slots.

An approach, related to reading more than one hash table entry at a time, is to divide the table into buckets 140 (FIG. 14). For example, one could replace a table of 1024 slots with a table of 64 buckets each of which contains 16 slots. To search for an entry, a linear search can be performed within the bucket (or possibly a binary search if the keys within each bucket are sorted). Only occasionally does a bucket fill, in which case the overflow can move to the next bucket. So long as the fable is not allowed to grow too full, overflow chains should not become too long. An advantage of index buckets is that they create units for disk access so that the number of random access disk seeks is reduced.

VII. Hash Table Storage

Figure 8:
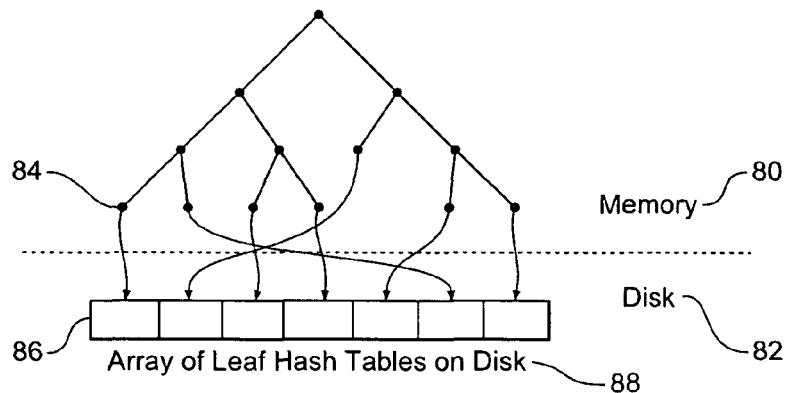
FIG. 8 shows how the binary digital search tree may be held in memory and the hash tables in the leaves on disk, here in a file containing an array of hash tables.

Conceptually, each leaf of the tree "contains" a hash table regardless of where various parts of the tree may be stored. In practice, the leaf node in memory could contain the actual hash table or the location of the hash table on disk. In a typical embodiment in which the tree is stored in memory 80 and the hash table on disk 82, the leaf node 84 in memory would store a pointer to the position of the leaf's hash table 86 on disk 82 (FIG. 8).

Storing the hash tables is simple if they are all the same size. Simply allocate a file or a portion of a disk and store the hash tables as an array in the file or portion of disk 88 (FIG. 8). The hash tables in the array can be stored in any order.

In other embodiments in which all the hash tables are not the same size, the table could be stored using a heap structure on disk.

VIII. Hash Table Splitting

When a leaf 62 is split into a non-leaf 64 and two new leaves 66, 68, the contents of the leaf's hash table is divided between the two new leaves (FIG. 6).

Figure 15:
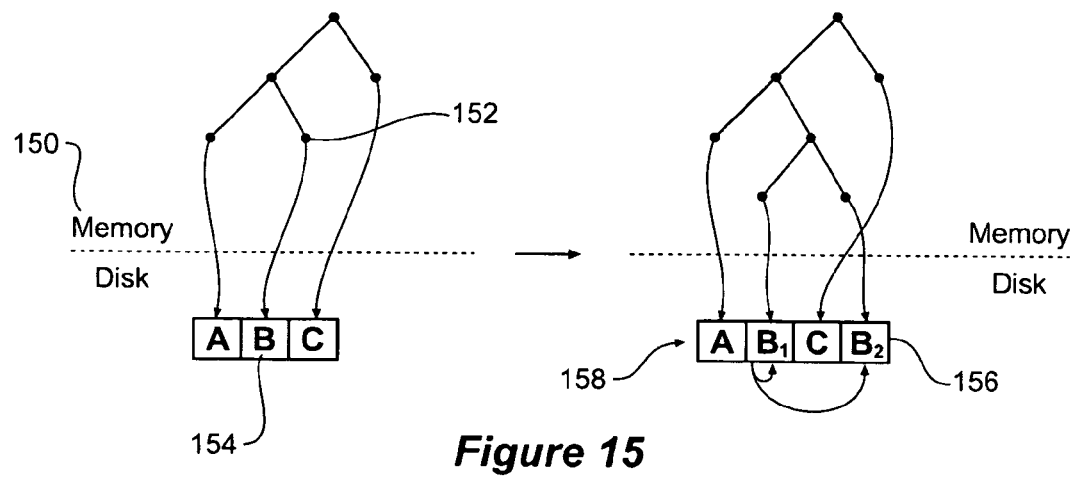
FIG. 15 depicts how, when a leaf node splits, its existing hash table can be used as the hash table of the left leaf.

If leaf hash tables are all of the same size and are stored in an array on disk 150, the existing leaf's hash table can become the new left leaf's 152 hash table 154 and a single extra hash table 156 can be appended to the end of the hash table array 158. In the embodiment of FIG. 15, the leaf node that points to hash table B splits, becoming a new non-leaf node with two leaf node descendents. The space used to hold hash table B is used to hold the new left hash table B1 and a new hash table is created at the end of the array of hash tables to contain the new right leaf hash table B2.

One might at first think that, having re-used the original leaf as the new left leaf and having created a new right leaf, splitting the original leaf would be as simple as performing a single pass through its hash table and moving the elements whose next bit is a 1 to the right hash table. However, this approach suffers two difficulties. The first difficulty is overflow. If entries are removed from a table, the overflow chains in the table may be broken, rendering some entries inaccessible. The second difficulty is that if the entries have been hashed using the K bits following the top T bits used to get to the original leaf, then the first of those K bits should no longer be used because it is now used to traverse the final link of the tree to the new leaves.

Figure 19:
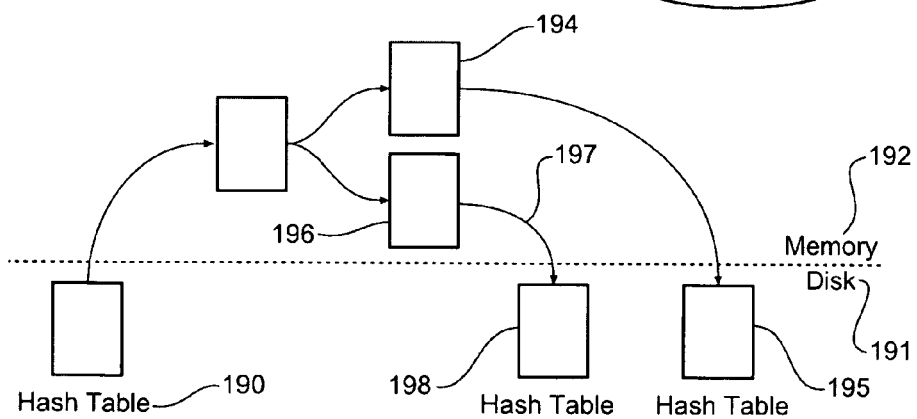
FIG. 19 depicts the splitting of a hash table by loading it from disk to memory, splitting it in memory, then writing the two hash tables to disk.

For all these reasons, the simplest way to split a hash table 190 is to read it into memory 192, create two new fresh empty hash tables 194, 196 in memory and perform a single pass through the original hash table and enter each entry into one or other of the two new hash tables. Then write 197 the two new tables 198, 195 to disk 191 (FIG. 19).

No matter how the splitting is performed, it is advantageous if the entries themselves contain enough of their keys to enable the splitting to occur without having to access another data structure, particularly one on disk.

IX. Growing the Tree

When should a leaf be split? A number of heuristics can be used and each of these equates to a different concept of "fullness".

Perhaps the most obvious heuristic is to split the leaf when its hash table is completely full. While simple, this heuristic is likely to make using the table slow because, just prior to the split, the average overflow chain length of the slots will be about half the length of the table.

A leaf could be split when its hash table is more than a certain proportion full. For example, a leaf could be split when its hash table becomes more than 80% full (i.e. contains >=0.8 S entries where S is the number of slots).

A leaf could be split when the longest overflow chain in the table reaches a predetermined length—for example 30 overflows. The predetermined length should be set high enough to yield acceptable densities but low enough to not to cause overflow chains so long that they are inefficient to traverse.

A leaf could be split when, in the course of adding entires to the leaf's table, an overflow chain of length greater than a predefined threshold is encountered. A leaf could be split with a predetermined probability P each time a new entry is added, or if the table becomes full. Setting P too low could waste too much space in the hash tables. Setting P too high could create overflow chains that may be inefficient to traverse.

X. Tree Growth Smoothing Techniques

Experience with the tree structure has shown that in embodiments where the keys are subblock hashes, the keys are usually so uniformly distributed that the leaves in the tree all tend to split at roughly the same time. This causes a temporary reduction in speed while the splitting occurs. These dips in performance occur at doubling intervals with the spread of the dip becoming wider with each iteration. Nevertheless, the dip can impact realtime performance, and so it is worth investigating means for ameliorating it.

One simple way to increase the time period over which each level splits (as distinguished to the time when it splits) is to assign a random threshold to each leaf when it is created. For example, each leaf could be allocated a uniformly distributed random density threshold between 60% and 90%. The leaf is then split when its hash table density exceeds the threshold. Because each leaf splits at its own density, the splitting of a level is diffused over a greater span of time. An alternative to the static scheme just described is for the threshold to be changed randomly each time the threshold is tested.

Figure 16:
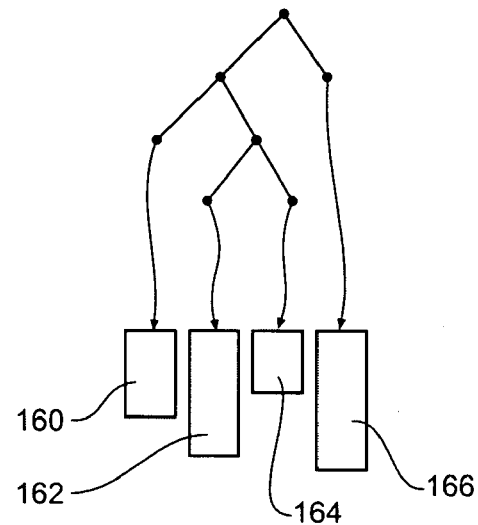
FIG. 16 depicts a binary digital search tree with leaves containing hash tables of varying sizes.

Another approach, which may make better use of space, is to use a constant splitting threshold (e.g. 80%), but to create different sized hash tables 160, 162, 164, 166 in each leaf (FIG. 16). This causes the leaves to split at different times. For example the random value can be set between X and Y, where X is not so low as to cause unnecessary splitting and Y so high as to cause a disruption to real time processing.

In some embodiments, it may be advantageous to choose for each table a random size selected from one of a small set of sizes (e.g. 1 Kilobyte, 2K, 4K, 8K).

XI. Replacing the Top of the Tree with an Array

Figure 9:
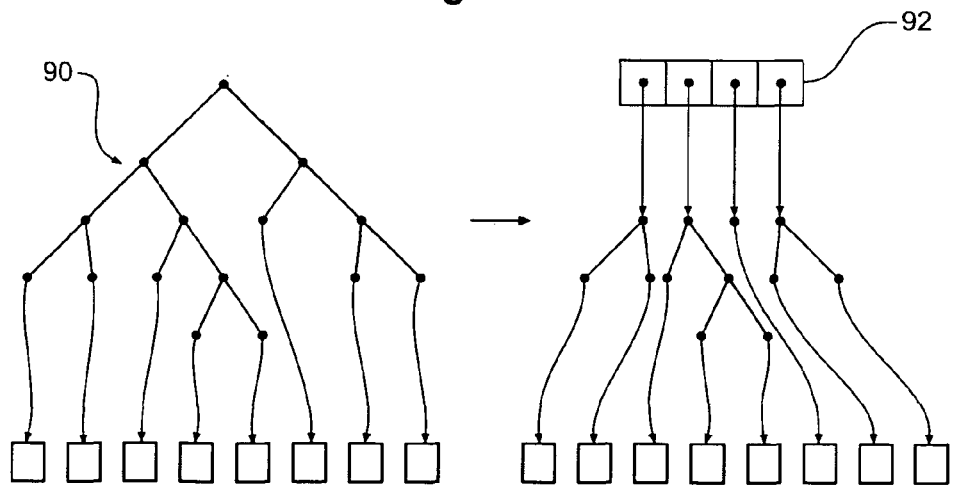
FIG. 9 shows how the top of the binary digital search tree can be replaced by an array.

As the hash values keys are very likely to be uniformly distributed, it is likely that the tree will grow in a very balanced manner. This means that, it is likely that entire levels (e.g. level 3) 90 of the tree will become full with non-leaf nodes. When this happens, the entire top of the tree (to (say) level L) can be replaced with a single array 92 (FIG. 9), reducing the access time for that part of the tree from O(L) to O(1).

Figure 17:
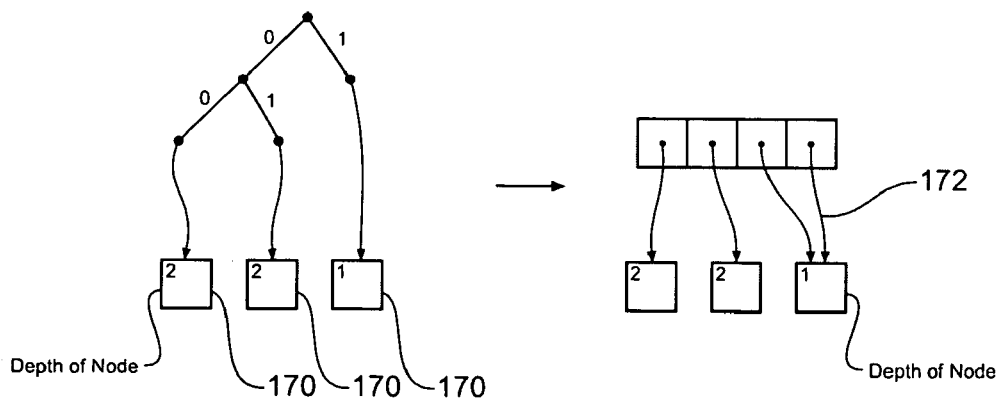
FIG. 17 depicts how level numbers make it possible to replace the first L levels of a binary digital search tree by an array, even if level L is not yet full. In this figure the first two levels are replaced.
Figure 18:
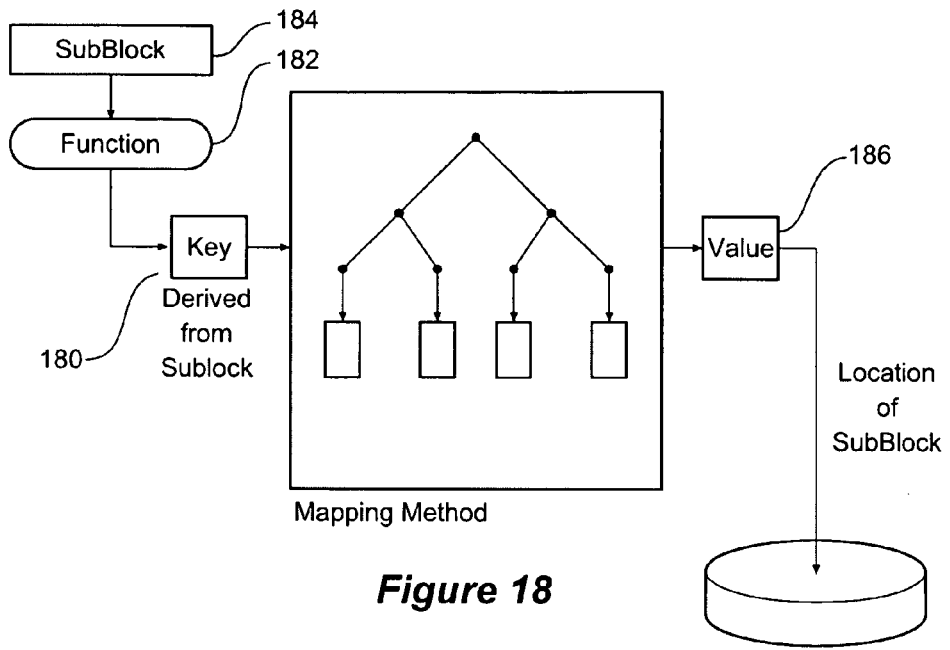
FIG. 18 depicts a mapping method where the keys are derived from the subblock and the values are the locations of the subblocks.

A variety of heuristics could be used for determining when to replace the top of the tree. A simple approach is to replace the top L levels of the tree only when level L consists entirely of non-leaf nodes. While simple, it is conceivable that this technique could break down as the tree grows because some nodes of lower levels might "hold out" for a while and not split. To cater for this, a heuristic could be employed that causes the top L levels of the tree to be replaced if the top L levels contain more than X % of non-leaf nodes (where X is a predefined threshold, (e.g. 80%), which is not so low as to waste space but not so high as to be too stringent a requirement to invoke the optimisation). One way to implement this is to place a field 170 in each node being the node's depth. Then, a pointer 172 to a single leaf node could be placed in multiple slots in the same array. If the leaf fills and splits, pointers to the resulting two leaves could fill the positions in the array occupied by the original leaf (FIG. 17).

As a theoretical aside, it is possible that the complexity of O(1) is achieved for a data structure that uses hashes as keys and has an array at the top of the tree and hash tables in the leaves. The array at the top is clearly O(1). The hash table in the leaf is also clearly O(1). This leaves only the layers of non-leaf nodes between the array and the leaves to introduce any complexity of an order higher than O(1). If the hashes are uniformly distributed, then it seems likely that a proof could be constructed showing that the average number of levels between the array and the leaves is O(1) which would mean that the entire data structure has an O(1) access time.

Of possible theoretical (and possibly practical) concern is the hash table splitting operation which involves moving every existing element in a leaf's hash table to one of two different descendent node hash tables. Could the doubling cause the growing data structure to cost more than O(1) per update? The answer is no, because, viewed from the perspective of an individual entry, the splitting operation occurs at time intervals that double. The total splitting cost per entry for hash tables of length N that are filled before being split is therefore 1/N+½N+¼N+⅛N . . . which adds up to 1 which is O(1).

XII. Other Data Structures

An alternative approach to maintaining a tree of hash tables is to replace the tree with a single master hash table. This could be achieved by creating a hash entry in the master table for each of the nodes that would otherwise be stored in a binary search tree.

XIII. Complexity Attacks

A complexity attack occurs on a system when the attacker feeds data into the system that is designed to drive one of the system's data structures into its worst case state. For example, if an attacker knows that a web server employs a non-balanced binary tree, he could feed sorted data into the tree to cause the tree to become a list. This might yield such bad subsequent search times that the server grinds to a halt.

The present invention does not appear to be vulnerable to complexity attacks (for embodiments where the cryptographic hashes are used as keys) in the long run because, as the tree deepens, it will become more and more computationally expensive for an attacker to find subblocks that hash to a particular leaf. However, until that scale is reached, each individual hash table is vulnerable to a complexity attack if the attacker feeds in subblocks that hit the same slot repeatedly. This would cause a very long overflow chain to form within the table which could slow down subsequent searches within that table.

The soundest way to avoid a complexity attack is to design a data structure that has a good worst case. Although this is possible with some balanced tree structures, this is not easy to do with a hash table because, no matter how chaotic the hash function is, it is possible for an all-knowing attacker to form the next key in such a way that it will land on the hash table's longest chain.

Figure 20:
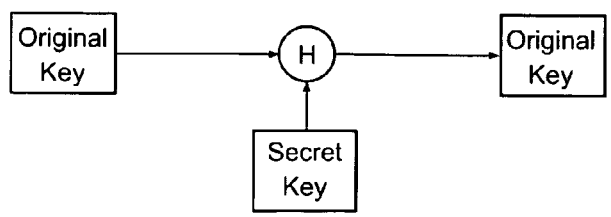
FIG. 20 depicts the hashing of a key with a secret key to prevent a complexity attack on the data structure.

If we accept that the probability of the hash table's worst (or near worst) case arising at random is negligible (so long as the table is not approaching its maximum density), then one way to defend against a complexity attack in a hash table is to generate a secret random seed when the hash table is created and hash the subblock hash with the seed to yield the hash table slot (FIG. 20). So long as the attacker does not know the seed, a complexity attack will be practically impossible.

XIV. A Note on Scope

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications within its scope.

What is claimed is:

1. A method for controlling a reduced redundancy storage system to index data in the reduced redundancy storage system, by indexing one or more unique blocks of data processed by the reduced redundancy storage system, the method comprising:

creating an index on the reduced redundancy storage system, the index comprising a digital search tree having non-leaf nodes and descendant-free leaf nodes, the digital search tree having keys derived from the unique blocks;

where a descendent-free leaf node of the tree comprises a hash table configured to store an index value for a key that falls within the descendent-free leaf node;

where the hash table has a fullness splitting threshold, where the threshold for the hash table has a random component;

where the non-leaf nodes are stored in a computer random access memory, where an index value comprises the location of a unique block in a unique block pool of the reduced redundancy storage system;

where the keys derived from the unique blocks are separate from the index values; and performing a leaf hash table lookup at the end of a binary tree root to leaf traversal of the digital search tree in a single random access disk seek.

2. The method of claim 1, where the digits of the digital search tree correspond to the successive bits of the key.

3. The method of claim 1, where the hash table comprises buckets.

4. The method of claim 1, where the keys are fixed length hashes of unique blocks in the unique block pool of the reduced redundancy storage system.

5. The method of claim 4, where part of the hash of the block is used to index the hash table.

6. The method of claim 1, where the hash tables associated with the leaves are stored in an array.

7. The method of claim 6, where the array is in memory.

8. The method of claim 1, where the top L levels of a subtree of the digital search tree are replaced by an array.

9. The method of claim 8, where the top L levels of the digital search tree are replaced by an array.

10. The method of claim 8, where the array has 2L elements.

11. The method of claim 8, where the replacement is performed when the L levels of the subtree satisfy a predetermined criterion.

12. The method of claim 11, where the predetermined criterion is that the top L levels of the subtree consists of non-leaf nodes.

13. The method of claim 11, where the predetermined criterion is that the top L levels of the subtree contain at least T percent non-leaf nodes where T is a predetermined threshold.

14. The method of claim 1, where the digital search tree is expanded by replacing a leaf node with a non-leaf node having a plurality of new leaf nodes attached, where the contents of the hash table in the old leaf node is distributed among the hash tables of the new leaf nodes.

15. The method of claim 14, where expansion occurs when the fullness of a hash table exceeds a predetermined threshold.

16. The method of claim 14, where a new leaf is created with the hash table, where the hash table is configured to vary in size.

17. The method of claim 16, where the size of the hash table is chosen between a predefined minimum and a predefined maximum.

18. The method of claim 17, where the size of the hash table is chosen randomly between a predefined minimum and a predefined maximum.

19. The method of claim 16, where the determination of the size has a random component.

20. The method of claim 14, where the hash table is split by reading the hash table into memory, splitting the hash table into two hash tables, and writing the two hash tables to disk.

21. The method of claim 14, where storage space consumed by the hash table of the original leaf is reallocated to be the hash table of one of the descendent leaves.

22. The method of claim 14, where the hash table uses overflow chains, and where the hash table is split when the longest overflow chain reaches a predetermined threshold.

23. The method of claim 14, where the hash table uses overflow chains, and where the hash table is split when an overflow chain greater than a predetermined length is traversed.

24. The method of claim 14, where the hash table is split when the hash table becomes full or with a predetermined probability P whenever a key/value pair is added to the hash table.

25. The method of claim 1, where the digital search tree is held in memory and the hash tables in the leaves are held on disk.

26. The method of claim 1, where the keys are first hashed using a secret key configured to prevent a complexity attack on the data structure.

27. The method of claim 1, where the location of the block is one of, a position of the block on disk, a filename of a file in which the block is stored, a file number of a file in which the block is stored, a block cluster number of a cluster in which the block is stored, a combination of a cluster number and block identifier within the cluster.

28. The method of claim 1, where the location of the block is the location of the block in a network.

29. A non-transitory computer-readable medium storing computer executable instructions that when executed by a computer cause the computer to perform a method, the method comprising:

maintaining an index for data blocks in a data de-duplication system, where the index includes a search tree with non-leaf nodes and descendant-free leaf nodes, where a descendant-free leaf node includes a hash table that stores an index value for a key that maps to the descendant-free leaf node, where the hash table has a fullness splitting threshold, and where the threshold for the hash table has a random component, where the key is derived from a data block in the data de-de-duplication system and is separate from the index value, and where the non-leaf nodes are maintained in an array in a first memory and the leaf-nodes are stored in a second memory that is a higher latency than the first memory; and performing a hash table lookup for a data block using the search tree, where the hash table lookup occurs in a single disk seek, and where an index value returned from the hash table lookup includes a pointer to the data block in the data de-duplication system.

\* \* \* \* \*